United States Patent [19]
Perrin

[11] Patent Number: 5,918,925
[45] Date of Patent: Jul. 6, 1999

[54] NESTING VEHICLE TAILGATE ASSEMBLY

[75] Inventor: Timothy B. Perrin, Roscoe, Ill.

[73] Assignee: Chrysler Corporation, Auburn Hill, Mich.

[21] Appl. No.: 08/699,320

[22] Filed: Aug. 19, 1996

[51] Int. Cl.⁶ .................................................. B62D 33/03
[52] U.S. Cl. ........................ 296/26.11; 296/50; 296/57.1
[58] Field of Search .......................... 296/50, 57.1, 37.6, 296/26, 106, 61, 62, 146.8; 414/537

[56] References Cited

U.S. PATENT DOCUMENTS

| | | | |
|---|---|---|---|
| 1,699,882 | 1/1929 | Ferguson | 414/537 |
| 1,919,063 | 7/1933 | Hubbard. | |
| 4,472,639 | 9/1984 | Bianchi | 296/26 |
| 4,531,773 | 7/1985 | Smith | 296/26 |
| 4,778,213 | 10/1988 | Palmer | 296/26 |
| 4,884,838 | 12/1989 | Slater | 296/180.1 |
| 4,889,378 | 12/1989 | Sims | 296/57.1 |
| 5,154,470 | 10/1992 | Bringman, Jr. | 296/26 |
| 5,320,397 | 6/1994 | Peterson et al. | 296/57.1 |
| 5,328,225 | 7/1994 | Melching et al. | 296/26 |
| 5,468,037 | 11/1995 | Peterson et al. | 296/57.1 |
| 5,468,038 | 11/1995 | Sauri | 296/26.11 |
| 5,478,130 | 12/1995 | Matulin et al. | 296/57.1 |

FOREIGN PATENT DOCUMENTS 0273721  11/1989  Japan ................... 296/106

*Primary Examiner*—Dennis H. Pedder
*Attorney, Agent, or Firm*—William J. Coughlin

[57] ABSTRACT

A nesting vehicle tailgate assembly comprising a primary leaf with a first and second edge, the first edge pivotally connected to the vehicle, the primary leaf defining a recess, the secondary leaf having a first and second edge, the first edge of the secondary leaf pivotally connected to the second edge of the primary leaf, the secondary leaf shaped to nest within the recess.

12 Claims, 3 Drawing Sheets

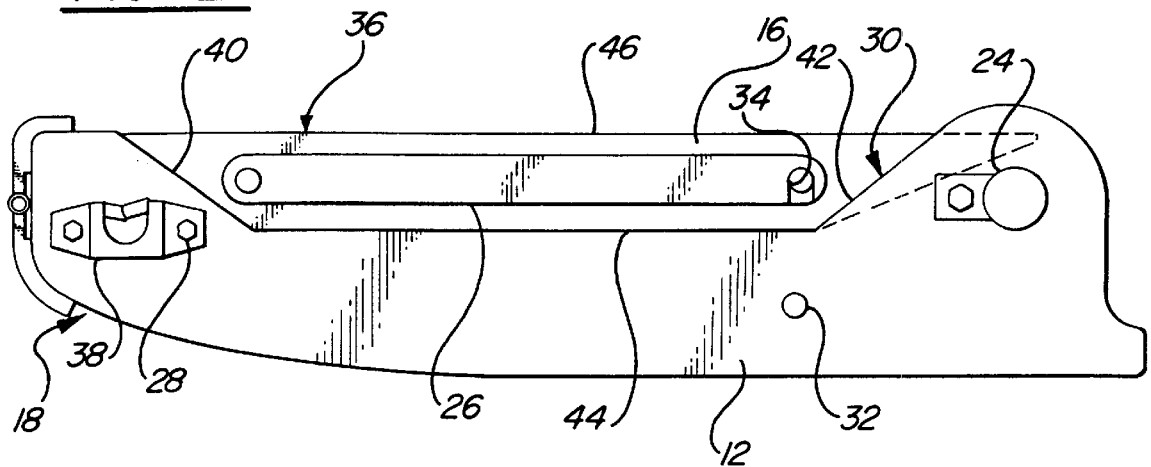
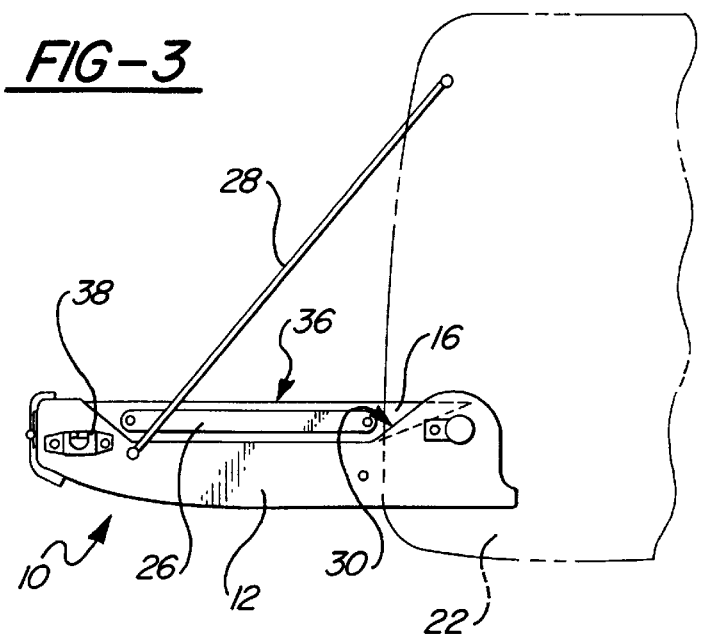

NESTING VEHICLE TAILGATE ASSEMBLY

BACKGROUND OF THE INVENTION

1. Field of the Invention

The present invention generally relates to tailgates for pickup trucks, and, more particularly, to an extended vehicle tailgate assembly.

2. Description of the Related Art

Pickup trucks are often limited in cargo carrying capacity by the length of their beds, and it often is the case where the operator would like to carry an object that extends beyond the length of the bed. For that reason various apparatuses for extending pickup tailgates have been proposed. At the same time, it is desirable that an extended tailgate assembly be simple to use, that it not change the appearance of the vehicle, and that, when not in use, it lays flat and presents a pleasing appearance. The present invention provides an extended tailgate which nests within itself when not in use and which thereby presents such a flat and pleasing appearance and which does not take up excess space.

Accordingly, it is an object of the present invention to provide a nesting vehicle tailgate assembly that lays flat when not in use. It is another object of the present invention to provide a nesting vehicle tailgate assembly which may be used with a variety of vehicles. It is yet another object of the present invention to provide a nesting vehicle tailgate assembly which presents a pleasing appearance.

SUMMARY OF THE INVENTION

Accordingly, disclosed and claimed herein a nesting vehicle tailgate assembly with a primary leaf and a secondary leaf that is shaped to nest within the primary leaf.

In the preferred embodiment the primary leaf defines a recess and is pivotally connected to the vehicle, the secondary leaf is pivotally connected to the primary leaf, and the secondary leaf is shaped to nest within the recess. The primary leaf has first and second edges, with the first edge pivotally connected to the vehicle, the primary leaf defining a recess, the secondary leaf has first and second edges, the first edge of the secondary leaf pivotally connected to the second edge of the primary leaf, the secondary leaf shaped to nest within the recess, and the recess shaped to receive the secondary leaf.

In one embodiment the secondary leaf comprises first and second tapered surfaces connected by a top surface and a bottom surface to form a semi-hexagonal shape.

In another embodiment the first and second edges of the secondary leaf are connected by a curved surface.

In another embodiment the apparatus of the present invention comprises means to hold the secondary leaf perpendicular to the primary leaf.

The details of the present invention, both as to its structure and apparatus, can best be understood in reference to the accompanying drawings, in which like reference numerals refer to like parts and in which:

DESCRIPTION OF THE DRAWINGS

FIG. 2 and is a partial side view of the nesting vehicle tailgate assembly of the present invention in the nested position;

FIG. 3 is a side views of the nesting vehicle tailgate assembly of the present invention in the nested open position;

DETAILED DESCRIPTION OF THE INVENTION

Figure 1:
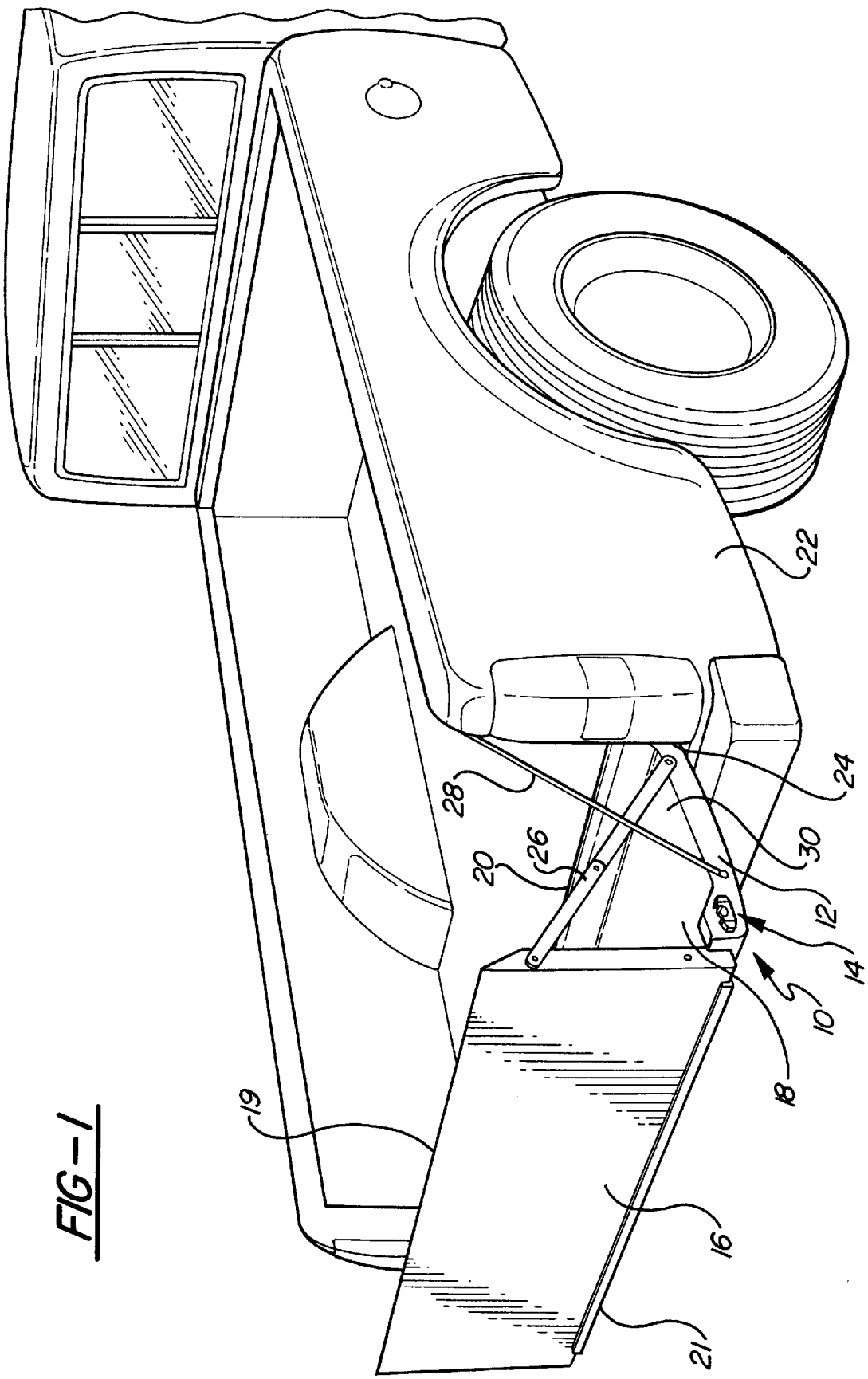
FIG. 1 is a perspective view of the nesting vehicle tailgate assembly of the present invention installed on a vehicle in the unnested raised position.

Turning to FIG. 1, the nesting vehicle tailgate assembly of the present invention is shown installed on a pickup truck in the unnested raised position. Nesting vehicle tailgate assembly 10 comprises primary leaf 12 which defines recess 30 and which is pivotally connected, preferably by a hinge 14, to first edge 21 of secondary leaf 16 at second edge 18 of primary leaf 12. Secondary leaf 16 also comprises second edge 19. Edges 19 and 21 are connected by curved surface 23. Primary leaf 12 is conventionally hinged at first edge 20 to pickup truck 22 via hinge 24. Braces 26 are provided at either side of secondary leaf 16 and primary leaf 12 to hold the secondary leaf in the raised position, as is shown in FIG. 1. Cable supports 28, connecting either side of primary leaf 12 to the pickup body provide support for the assembly.

Figure 5:
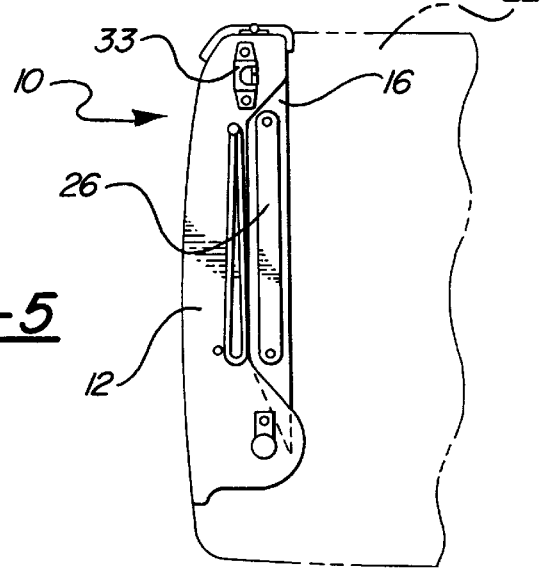
FIG. 5 is a side view of the nesting vehicle tailgate assembly of the present invention in the nested closed position.

Turning to FIG. 2, nesting tailgate assembly 10 is shown in the nested position. As can be seen, in the nested position a flat attractive surface 36 is present, whether the assembly is used nested open (FIG. 3) or nested closed (FIG. 5). In both cases a flat surface is desirable, both because it is aesthetically pleasing and does not present a change in appearance to the vehicle, and because in both cases a flat surface is presented that does not interfere with articles being transported. Storage capability is maximized and articles are allowed to lay flat.

In the nested position, secondary leaf 16 fits within recess 30 of primary leaf 12. The shape of the secondary leaf corresponds to the recess, and they may be of any desired shape. In the preferred embodiment shown secondary leaf 16 comprises first tapered surface 40 and second tapered surfaced 42, connected by flat bottom surface 44 and flat top surface 46 to form a semi-hexagonal shape. In another embodiment (not shown) the first and second edges of the secondary leaf may be connected by a curved surface that nests within a curved recess formed by the primary leaf.

When the apparatus of the present invention is used in the nested position, braces 26 are disconnected from the strikers 32, which in the unnested raised position engage striker recesses 34 of braces 26. As can be seen, secondary leaf 16 is shaped to nest cleanly with the recess 30 of primary leaf 12, so that a flat surface area 36 is present when the apparatus of the present invention is nested. In cable supports 28 are attached to latches 38 on either side of primary leaf 12.

Turning to FIG. 3, the apparatus of the present invention is shown in the nested open position. Secondary leaf 16 nests within primary leaf 12, and cable supports 28 support the assembly. When used in this position, the apparatus of the present invention acts as a conventional tailgate, and due to the nesting feature, presents a flat surface 36.

Figure 4:
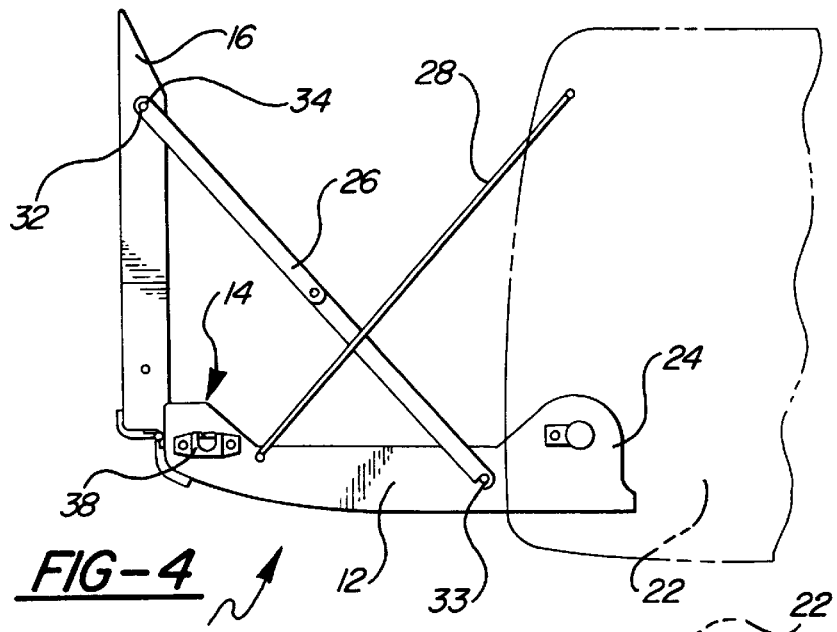
FIG. 4 is a side view of the nesting vehicle tailgate assembly of the present invention in the unnested raised position.

Turning to FIG. 4, the apparatus of the present invention is shown in the unnested raised position. In the preferred embodiment the apparatus of the present invention comprises means for holding secondary leaf 16 perpendicular to primary leaf 12 which preferably comprises braces 26 which hold secondary leaf 16 at approximately a 90 degree angle from primary leaf 12, which are connected to the secondary leaf via striker recesses 34 which engage strikers 32, and to the primary leaf via pivots 33. Other suitable means may be used to hold the two leaves perpendicular. In the unnested raised position in which it is perpendicular to the primary leaf, secondary leaf 16 presents a barrier to prevent long articles extending out of the bed and across the primary leaf from dropping out of the rear of the bed.

FIG. 5 shows the apparatus of the present invention in the nested closed position, where it acts as a conventional tailgate in the closed position and presents a flat surface 36, with no projections into the bed of the pickup to interfere with the normal loading or to detract from the appearance.

Figure 6:
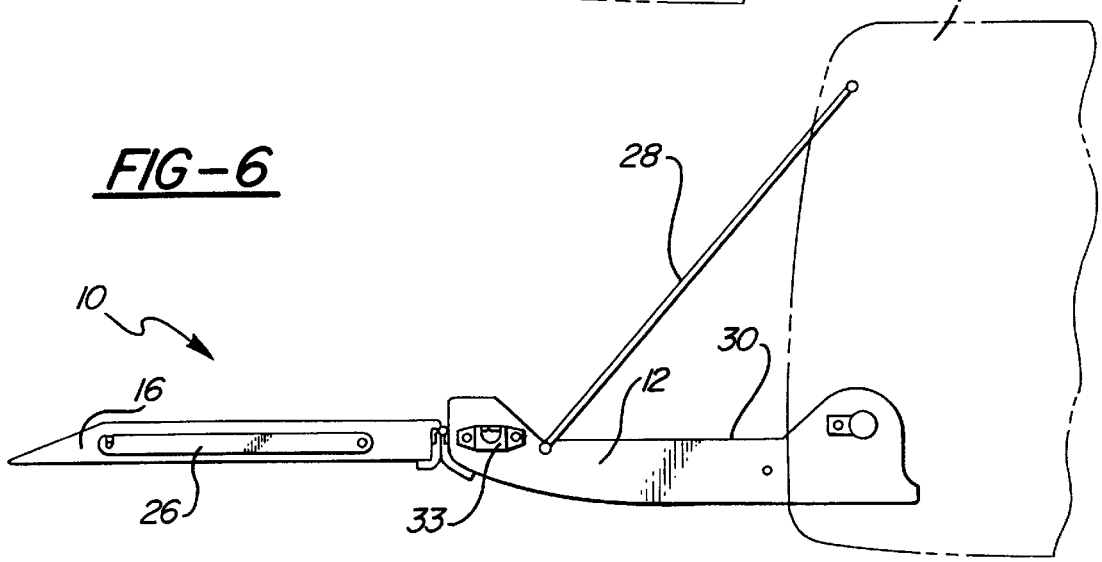
FIG. 6 is a side view of the nesting vehicle tailgate assembly of the present invention in the unnested extended position.

Turning finally to FIG. 6, the apparatus of the present invention is shown in the unnested extended position, with a maximum length bed provided.

While particular embodiments of the invention have been described above, the invention is not so limited. Alternative embodiments and modifications that would still be encompassed by the invention may be made by those skilled in the art, particularly in light of the foregoing teachings. Therefore, the following claims are intended to cover any alternative embodiments, modifications or equivalents that may be included within the spirit and scope of the invention as claimed.

What is claimed is:

1. A tailgate assembly for a motor vehicle having a body, the tailgate assembly comprising:

a primary leaf for connection to the body for pivotal movement between a vertical position and a horizontal position; and a secondary leaf connected to said primary leaf for pivotal movement about a laterally extending pivot axis between a first position, a second position and a third position when said primary leaf is in said horizontal position such that said secondary leaf is flush against said primary leaf in said first position, perpendicular to said primary leaf in said second position, and parallel to and extending rearwardly from said primary leaf in said third position;

wherein said primary leaf defines a recess and has first and second laterally extending edges, said secondary leaf having first and second laterally extending edges, said first laterally extending edge of said primary leaf for attachment to the vehicle, said second laterally extending edge of said primary leaf pivotally attached to said secondary leaf;

wherein said secondary leaf includes a first side and a second side, said first side being generally planar, said second side including first and second tapering portions adjacent said first and second laterally extending edges thereof, respectively, said recess nestingly receiving said secondary leaf when said secondary leaf is in said first position such that said first and second laterally extending edges of said primary leaf and said secondary leaf cooperate to define a substantially planar support surface.

2. The tailgate assembly of claim 1, wherein said secondary leaf laterally extends substantially the entire width of said primary leaf.

3. The assembly of claim 1, further comprising means for holding said secondary leaf perpendicular to said primary leaf.

4. A motor vehicle comprising:

a bed; and a tailgate assembly including:

a primary leaf connected to said bed for pivotal movement between a vertical position and a horizontal position; and a secondary leaf connected to said primary leaf for pivotal movement between a first position, a second position and a third position when said primary leaf is in said horizontal position such that said secondary leaf is flush against said primary leaf in said first position, perpendicular to said primary leaf in said second position, and parallel to and extending rearwardly from said primary leaf in said third position;

wherein said primary leaf defines a recess and has first and second laterally extending edges, said secondary leaf having first and second laterally extending edges, said first laterally extending edge of said primary leaf to the vehicle, said second laterally extending edge of said primary leaf pivotally attached to said secondary leaf;

wherein said secondary leaf includes a first side and a second side, said first side being generally planar, said second side including first and second tapering portions adjacent said first and second laterally extending edges thereof, respectively, said recess nestingly receiving said secondary leaf when said secondary leaf is in said first position such that said first and second laterally extending edges of said primary leaf and said secondary leaf cooperate to define a substantially planar support surface.

5. The motor vehicle of claim 4, further comprising means for holding said secondary leaf perpendicular to said primary leaf.

6. A tailgate assembly in combination with a motor vehicle having a body, the tailgate assembly comprising:

a primary leaf including a first side and a second side, said primary leaf connected to the body for pivotal movement; and a secondary leaf including a first side and a second side, said secondary leaf attached to said primary leaf for pivotal movement about a laterally extending pivot axis;

said tailgate assembly operative in a first mode in which said primary leaf is vertically oriented and said secondary leaf is nested within said primary leaf;

said tailgate assembly operative in a second mode in which said primary and secondary leaves are horizontally oriented and said secondary leaf extends rearwardly from said primary leaf;

wherein said first and second sides of said secondary leaf are parallel to one another and said second side of said secondary leaf is substantially shorter than said first side of said secondary leaf in a direction perpendicular to said laterally extending pivot axis.

7. The tailgate assembly for a motor vehicle of claim 6, wherein said secondary leaf laterally extends substantially the entire width of said primary leaf.

8. The tailgate assembly for a motor vehicle of claim 6, wherein said tailgate assembly is operative in a third mode in which said primary leaf and said secondary leaf are horizontally oriented, said secondary leaf being nested within said primary leaf in said third mode.

9. The tailgate assembly for a motor vehicle of claim 6, wherein said tailgate assembly is operative in an additional mode in which said primary leaf is horizontally oriented and said secondary leaf is vertically oriented.

10. The tailgate assembly for a motor vehicle of claim 9, wherein said first side of said primary leaf provides a substantially planar support surface when said tailgate assembly is in said additional mode.

11. The tailgate assembly for a motor vehicle of claim 6, wherein said first and second sides of said secondary leaf are interconnected by a pair of tapered surfaces.

12. The tailgate assembly for a motor vehicle of claim 11, wherein said primary leaf is configured to matingly receive said second side of said secondary leaf and said pair of tapered surfaces.

* * * * *